United States Patent
Yang et al.

(10) Patent No.: US 11,382,128 B2
(45) Date of Patent: Jul. 5, 2022

(54) CONSIDERATION FOR UPLINK CONTROL INFORMATION (UCI) MULTIPLEXING ACROSS DIFFERENT PRIORITIES

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US); Yi Huang, San Diego, CA (US); Peter Gaal, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 48 days.

(21) Appl. No.: 16/992,672

(22) Filed: Aug. 13, 2020

(65) Prior Publication Data
US 2021/0051704 A1     Feb. 18, 2021

Related U.S. Application Data

(60) Provisional application No. 62/888,389, filed on Aug. 16, 2019.

(51) Int. Cl.
H04W 72/14   (2009.01)
(52) U.S. Cl.
CPC .................................. H04W 72/14 (2013.01)
(58) Field of Classification Search
None
See application file for complete search history.

(56) References Cited

U.S. PATENT DOCUMENTS

| | | | |
|---|---|---|---|
| 9,819,458 B2 * | 11/2017 | Chen | H04L 5/001 |
| 2020/0236673 A1 * | 7/2020 | Xu | H04L 1/1812 |
| 2021/0298054 A1 * | 9/2021 | Wong | H04L 5/0012 |

OTHER PUBLICATIONS

Huawei, et al., "UL Intra-UE Multiplexing," 3GPP Draft, 3GPP TSG RAN WG1 Ad-Hoc Meeting 1901, R1-1900868, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593714, 6 pages, Retrieved from the Internet: URL: http://www.3gpp.org/ftp/Meetings%5F3GPP%5FSYNC/RAN1/Docs/R1%2D1900868%2Ezip [retrieved on Jan. 20, 2019] paragraph [0002].
International Search Report and Written Opinion—PCT/US2020/046366—ISAEPO—dated Nov. 16, 2020.
Vivo: "Discussion on eMBB and URLLC UCI Multiplexing", 3GPP Draft, 3GPP TSG RAN WG1 Meeting #93, R1-1806064 Discussion on eMBB and URLLC UCI Multiplexing, 3rd Generation Partnership Project (3GPP), Mobile Competence Centre, 650, Route Des Lucioles, F-06921, Sophia-Antipolis Cedex. F, vol. RAN WG1, No. Busan, Korea, May 21, 2018-May 25, 2018, May 20, 2018 (May 20, 2018), XP051441279, 4 pages, Retrieved from the Internet: URL: http://www.3gpp.org/ftp/Meetings%5F3GPP%5FSYNC/RAN1/Docs/, [retrieved on May 20, 2018], the whole document.

(Continued)

*Primary Examiner* — Hong S Cho
(74) *Attorney, Agent, or Firm* — Patterson+ Sheridan, L.L.P.

(57) ABSTRACT

Certain aspects of the present disclosure provide techniques for processing physical downlink shared channel (PDSCH) transmissions scheduled with non-numeric timing feedback indicators.

25 Claims, 15 Drawing Sheets

(56) References Cited

OTHER PUBLICATIONS

Vivo: "Remaining Issues on UL Data Transmission for URLLC", 3GPP Draft, 3GPP TSG RAN WG1 Meeting #92bis, R1-1806070, Remaining Issues on UL Data Transmission for URLLC, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018, XP051441284, 5 Pages.

ZTE: "On Scheduling/HARQ Processing Timeline for URLLC", 3GPP Draft, 3GPP TSG RAN WG1 #96, R1-1901770 on Scheduling/HARQ Processing Timeline for URLLC, 3rd Generation Partnership Project (3GPP), Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 16, 2019 (Feb. 16, 2019), XP051599464, 22 Pages, figure 5, Section 2.3.2.

* cited by examiner

| μ | PDSCH decoding time $N_1$ [symbols] | |
|---|---|---|
| | *dmrs-AdditionalPosition = pos0* in *DMRS-DownlinkConfig* in both of *dmrs-DownlinkForPDSCH-MappingTypeA, dmrs-DownlinkForPDSCH-MappingTypeB* | *dmrs-AdditionalPosition≠pos0* in *DMRS-DownlinkConfig* in either of *dmrs-DownlinkForPDSCH-MappingTypeA, dmrs-DownlinkForPDSCH-MappingTypeB* or if the higher layer parameter is not configured |
| 0 | 8 | $N_{1,0}$ |
| 1 | 10 | 13 |
| 2 | 17 | 20 |
| 3 | 20 | 24 |

FIG. 7A

| μ | PDSCH decoding time $N_1$ [symbols] |
|---|---|
| | *dmrs-AdditionalPosition =pos0* in *DMRS-DownlinkConfig* in both of *dmrs-DownlinkForPDSCH-MappingTypeA, dmrs-DownlinkForPDSCH-MappingTypeB* |
| 0 | 3 |
| 1 | 4.5 |
| 2 | 9 for frequency range 1 |

FIG. 7B

| μ | PUSCH preparation time $N_2$ [symbols] |
| --- | --- |
| 0 | 10 |
| 1 | 12 |
| 2 | 23 |
| 3 | 36 |

FIG. 8A

| μ | PUSCH preparation time $N_2$ [symbols] |
| --- | --- |
| 0 | 5 |
| 1 | 5.5 |
| 2 | 11 for frequency range 1 |

FIG. 8B

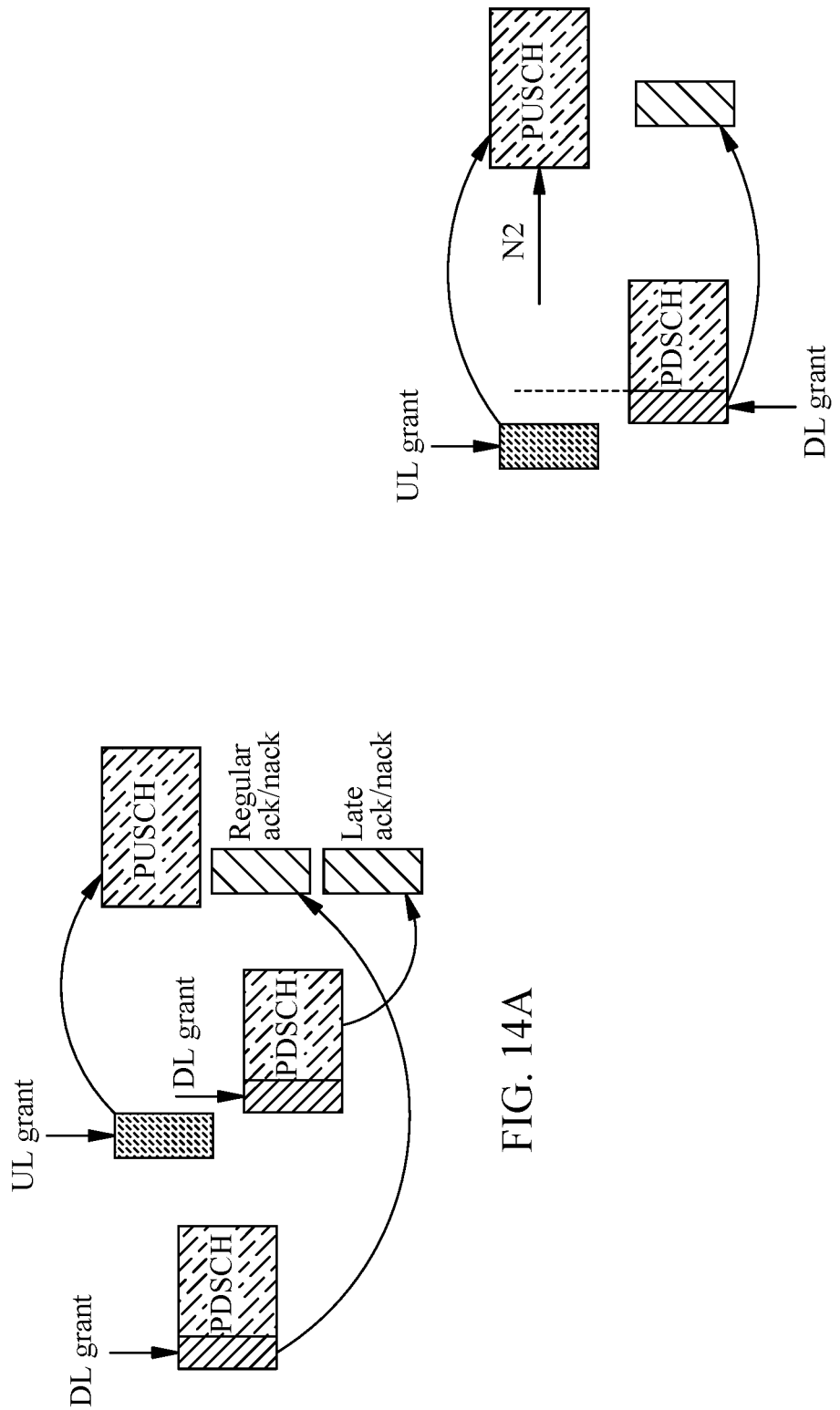

CONSIDERATION FOR UPLINK CONTROL INFORMATION (UCI) MULTIPLEXING ACROSS DIFFERENT PRIORITIES

PRIORITY CLAIM(S)

This application claims priority to and the benefit of U.S. Provisional Application No. 62/888,389, filed on Aug. 16, 2019, which is expressly incorporated by reference in its entirety as if fully set forth below and for all applicable purposes.

FIELD OF THE DISCLOSURE

Aspects of the present disclosure relate to wireless communications, and more particularly, to techniques for multiplexing uplink control information (UCI), such as acknowledgment feedback, across different priorities (such as different service types supported in a network).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a downlink grant for at least a first physical downlink shared channel (PDSCH) transmission of a first service type and multiplexing acknowledgment feedback for the first PDSCH transmission in an uplink transmission of a second service type, if one or more conditions are met.

Certain aspects of the present disclosure are directed to an apparatus for wireless communication by a UE. The apparatus generally includes a memory and at least one processor coupled to the memory, the memory and the at least one processor being configured to receive a downlink grant for at least a first physical downlink shared channel (PDSCH) transmission of a first service type and multiplex acknowledgment feedback for the first PDSCH transmission in an uplink transmission of a second service type, if one or more conditions are met.

Certain aspects of the present disclosure are directed to an apparatus for wireless communication by a UE. The apparatus generally includes means for receiving a downlink grant for at least a first physical downlink shared channel (PDSCH) transmission of a first service type and means for multiplexing acknowledgment feedback for the first PDSCH transmission in an uplink transmission of a second service type, if one or more conditions are met.

Certain aspects of the present disclosure are directed to an computer readable medium having instructions stored thereon for receiving a downlink grant for at least a first physical downlink shared channel (PDSCH) transmission of a first service type and multiplexing acknowledgment feedback for the first PDSCH transmission in an uplink transmission of a second service type, if one or more conditions are met.

Certain aspects provide a method for wireless communication by a network entity. The method generally includes sending a downlink grant to a user equipment (UE) for at least a first physical downlink shared channel (PDSCH) transmission of a first service type and processing acknowledgment feedback for the first PDSCH transmission from the UE multiplexed in an uplink transmission of a second service type, if one or more conditions are met.

Certain aspects of the present disclosure are directed to an apparatus for wireless communication by a network entity. The apparatus generally includes a memory and at least one processor coupled to the memory, the memory and the at least one processor being configured to send a downlink grant to a user equipment (UE) for at least a first physical downlink shared channel (PDSCH) transmission of a first service type and process acknowledgment feedback for the first PDSCH transmission from the UE multiplexed in an uplink transmission of a second service type, if one or more conditions are met.

Certain aspects of the present disclosure are directed to an apparatus for wireless communication by a network entity. The apparatus generally includes means for sending a downlink grant to a user equipment (UE) for at least a first physical downlink shared channel (PDSCH) transmission of a first service type and means for processing acknowledgment feedback for the first PDSCH transmission from the UE multiplexed in an uplink transmission of a second service type, if one or more conditions are met.

Certain aspects of the present disclosure are directed to an computer readable medium having instructions stored thereon for sending a downlink grant to a user equipment (UE) for at least a first physical downlink shared channel (PDSCH) transmission of a first service type and processing acknowledgment feedback for the first PDSCH transmission from the UE multiplexed in an uplink transmission of a second service type, if one or more conditions are met.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 7A and 7B illustrate example UE processing timelines for different UE capabilities.

FIGS. 8A and 8B illustrate example UE processing timelines for different UE capabilities.

FIGS. 14A and 14B illustrate example scenarios in which uplink control information (UCI) for one service type may be multiplexed in an uplink transmission for a second service type, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
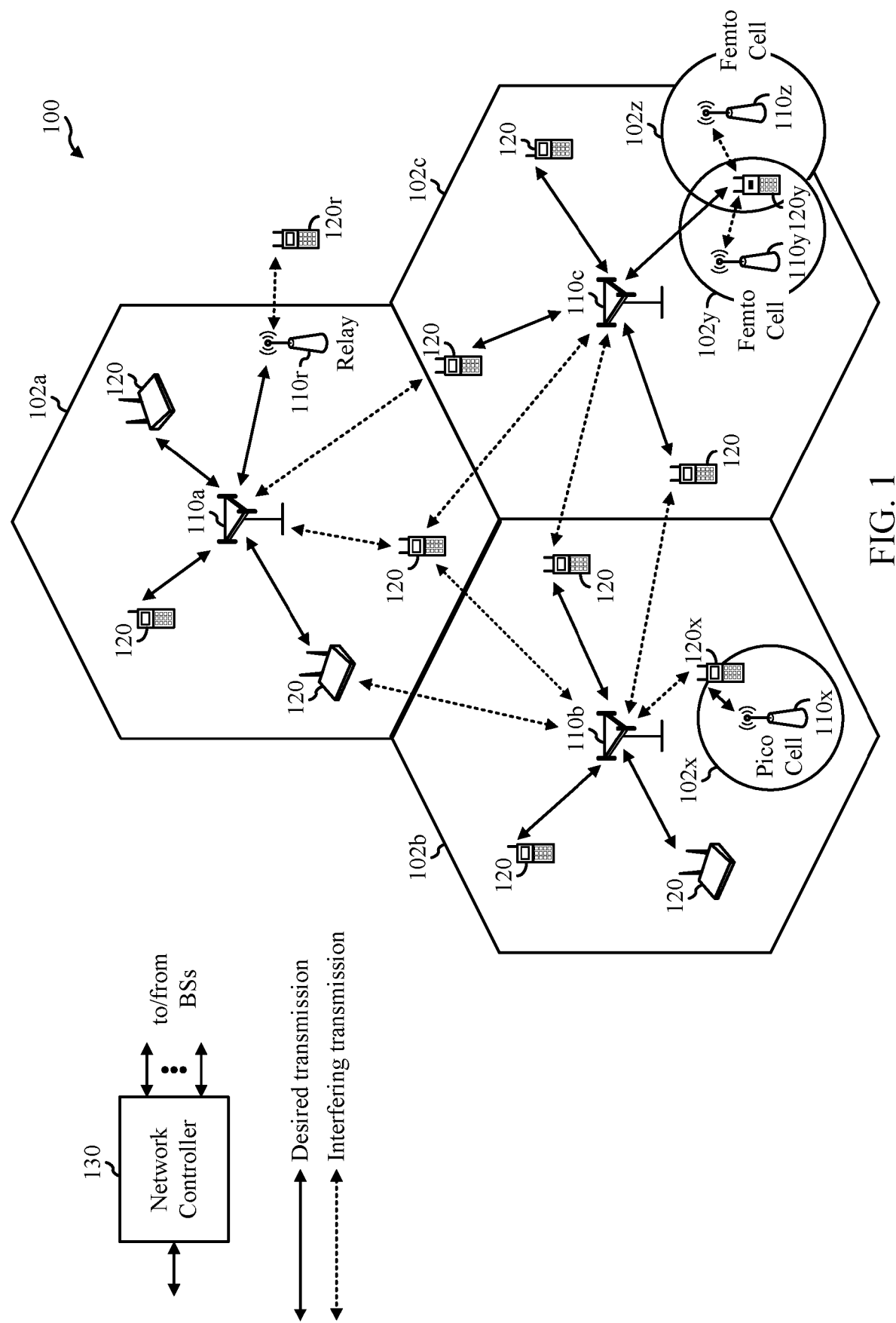
FIG. 1 is a block diagram conceptually illustrating an example telecommunications system, in accordance with certain aspects of the present disclosure.

Aspects of the present disclosure provide apparatus, methods, processing systems, and computer readable mediums for multiplexing uplink control information (UCI) across different priorities. For example, the techniques described herein may be used to multiplex acknowledgment feedback for one service type (e.g., eMBB or URLLC) in an uplink transmission of another service type.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 may be configured to perform operations described below with reference to FIG. 10 to multiplex UCI across different priorities. Further, a BS 110 may be configured to perform operations described below with reference to FIG. 11, for example, to process the multiplexed UCI sent by UE 120.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
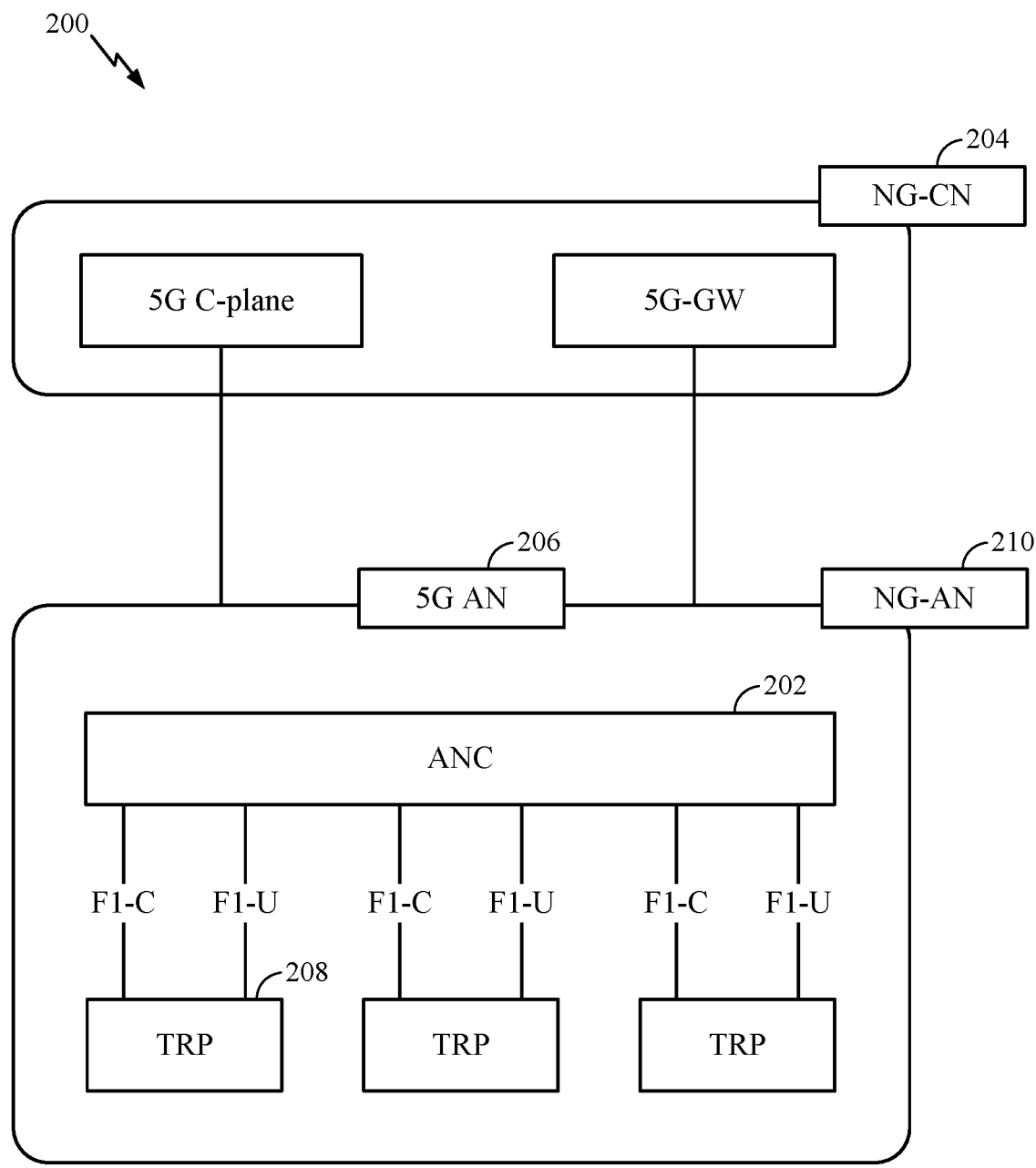
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
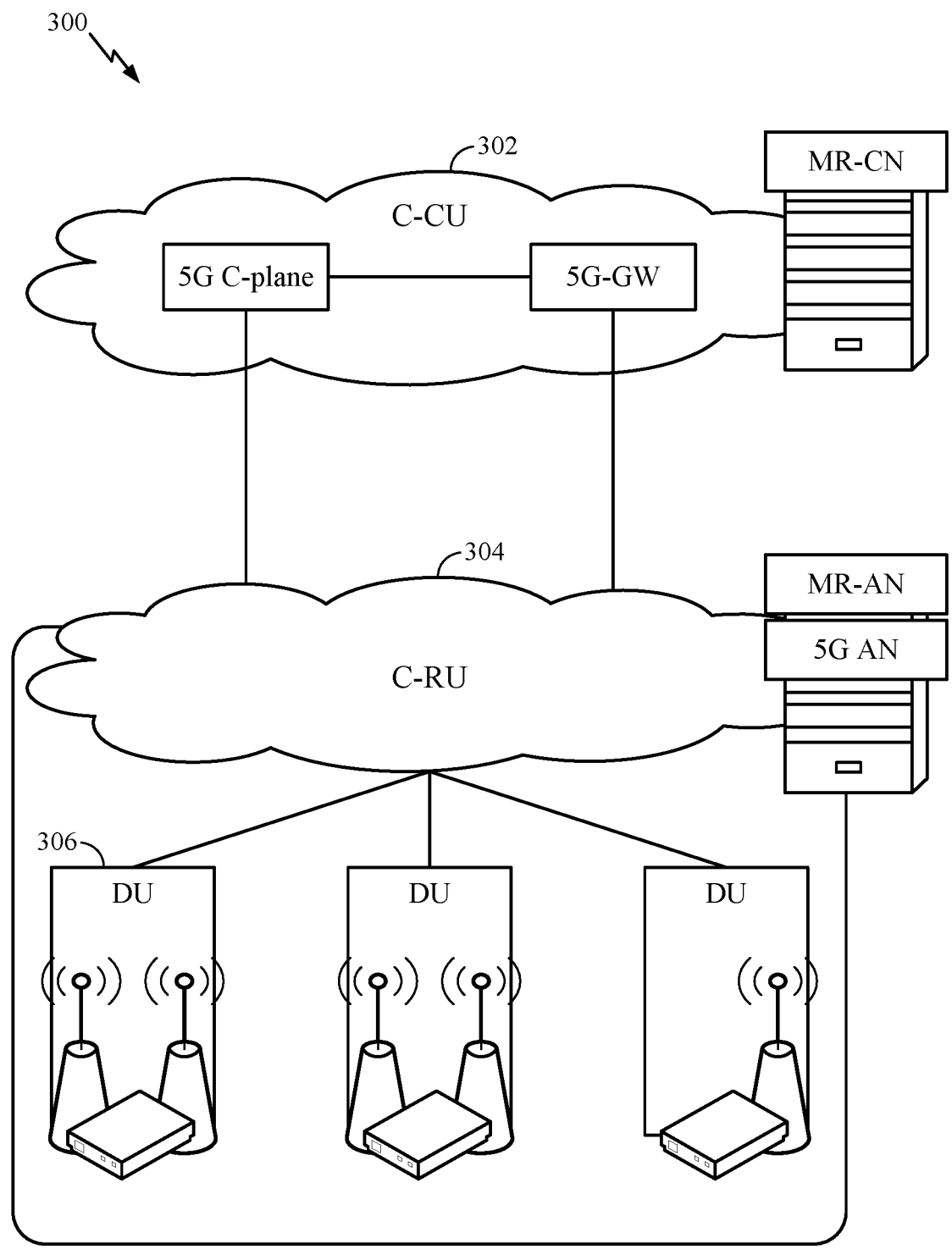
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
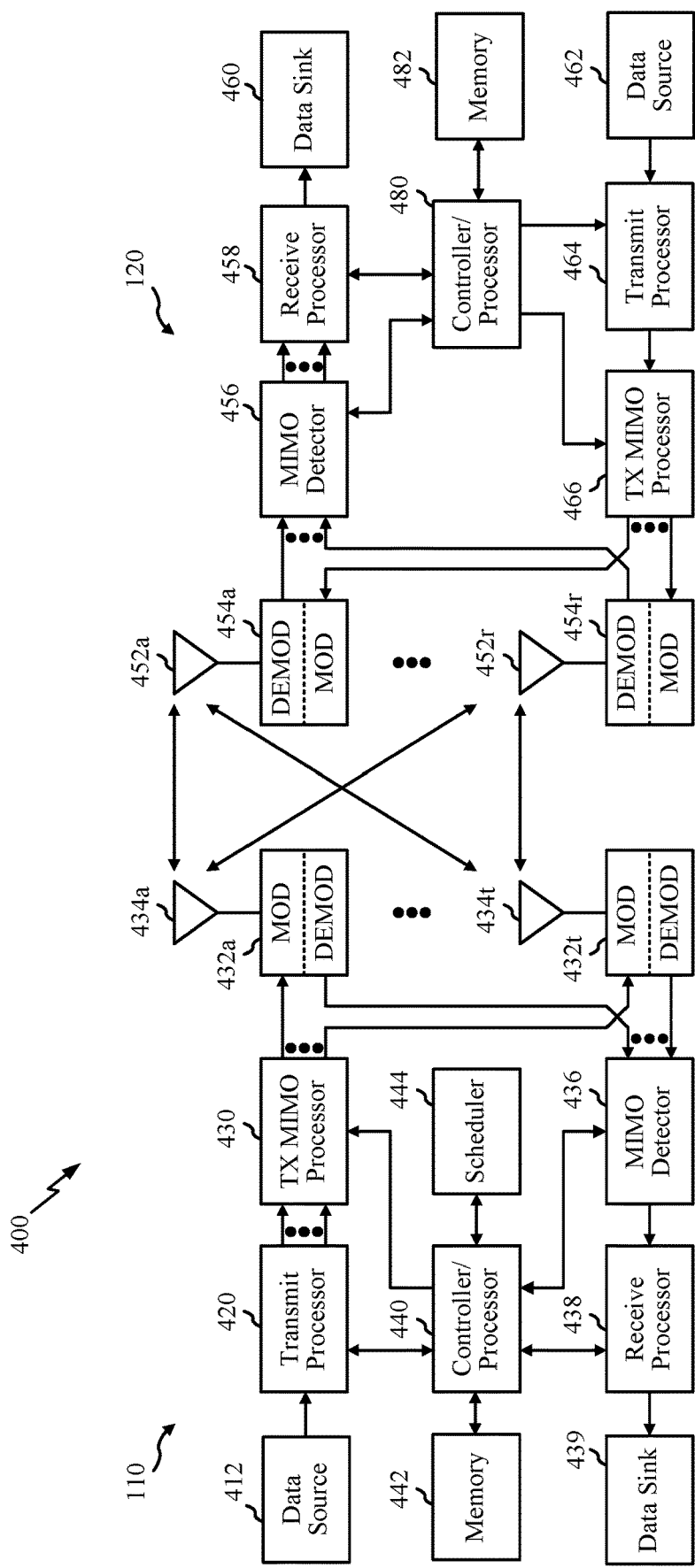
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for rate matching for multi-TRP transmission.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
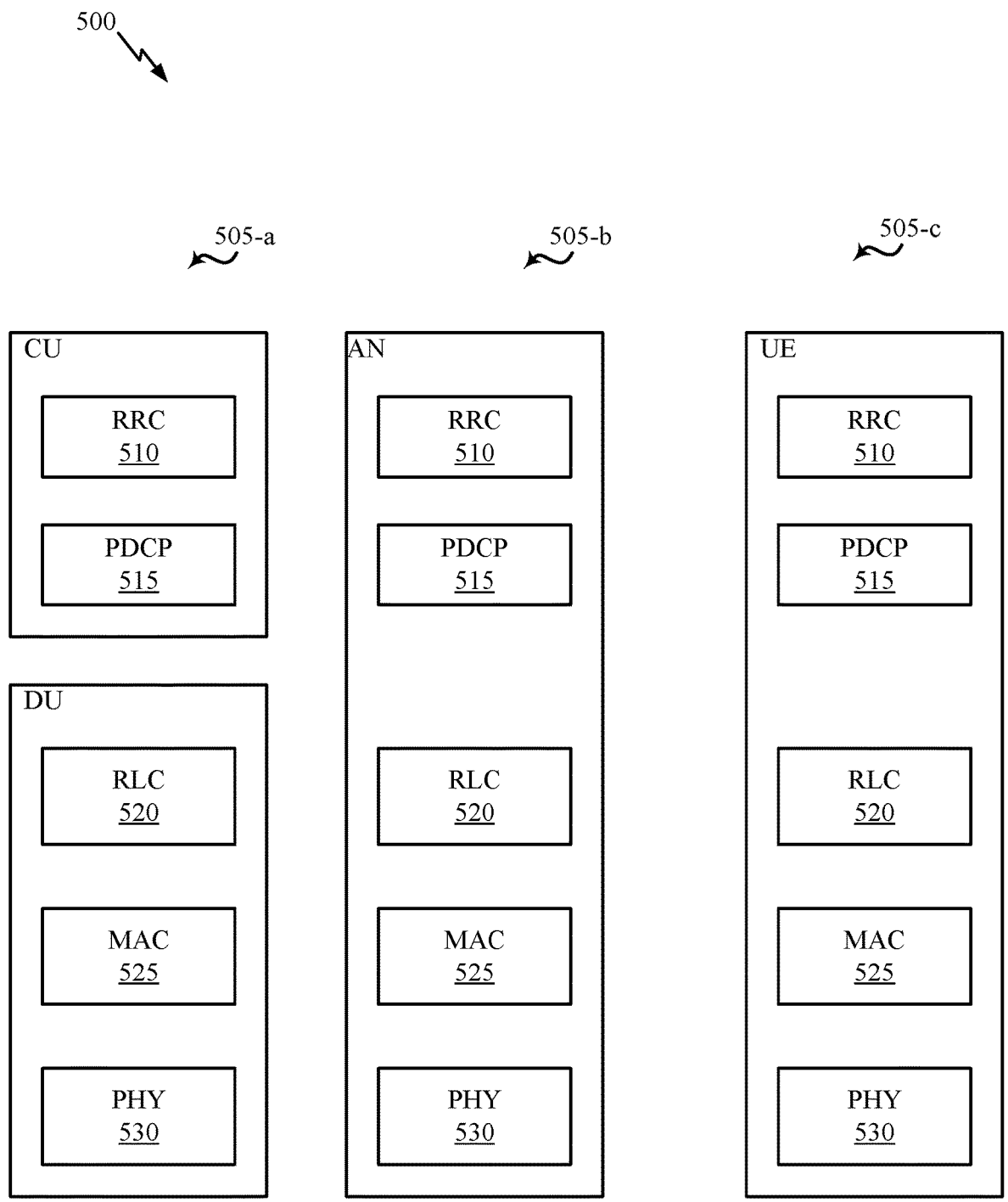
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
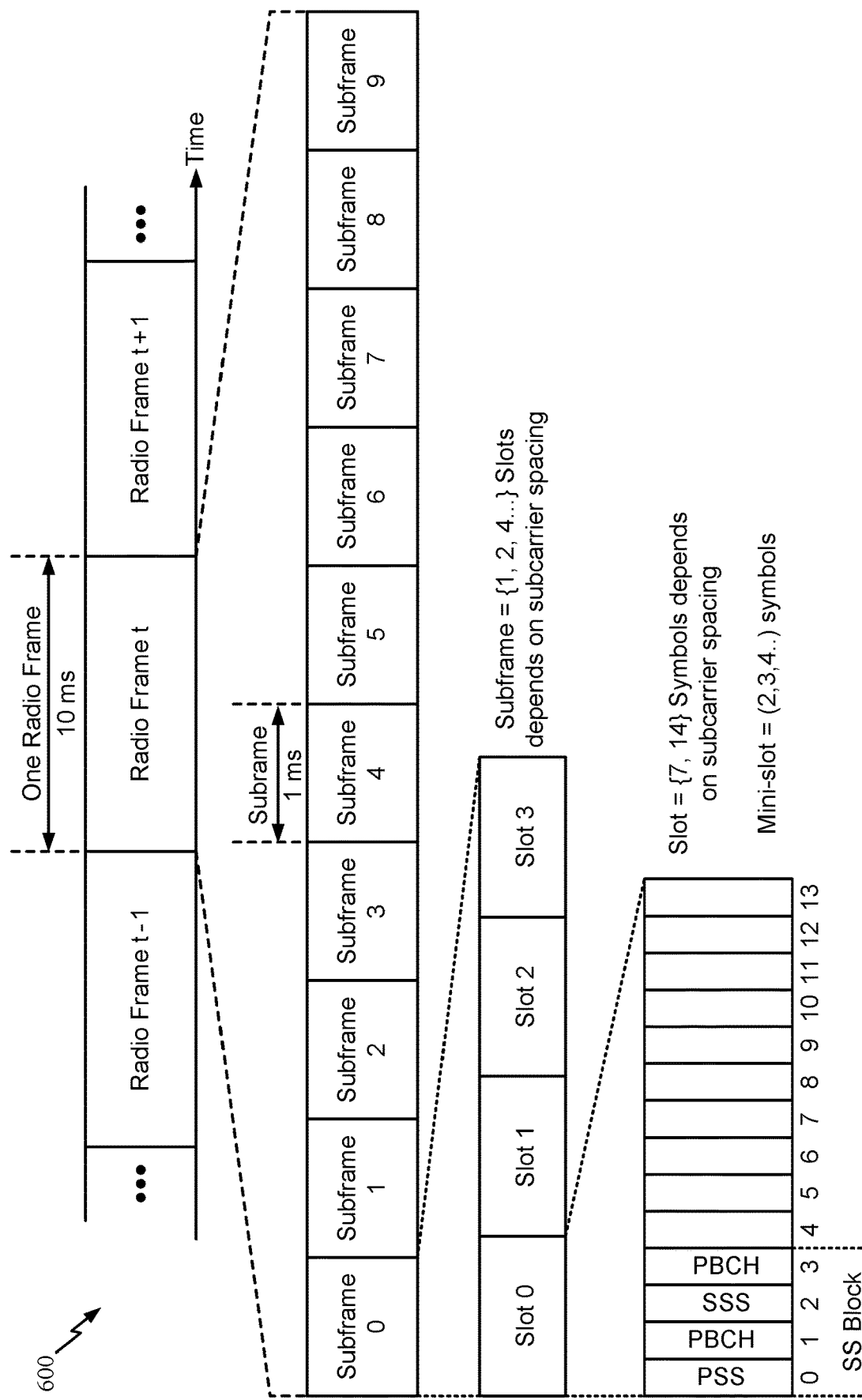
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Design Considerations for UCI
Multiplexing Across Different Priorities

Aspects of the present disclosure provide apparatus, methods, processing systems, and computer readable mediums for multiplexing uplink control information (UCI) across different priorities. For example, the techniques described herein may be used to multiplex acknowledgment feedback for one service type (e.g., enhanced mobile broadband (eMBB) or ultra-reliable low-latency communication (URLLC)) in an uplink transmission of another service type.

The techniques may allow a user equipment (UE) capable of simultaneously supporting different service types, such as eMBB and URLLC, as well as flexibility in providing feedback while meeting processing times dictated by the processing capability of the UE. For example, the techniques presented herein may allow a UE to multiplex (or "piggyback") eMBB UCI on a URLLC physical uplink shared channel (PUSCH), to multiplex URLLC UCI on eMBB PUSCH, and/or to multiplex eMBB and URLLC hybrid automatic repeat request (HARQ) acknowledgements (ACKs) together (e.g., in a single physical uplink control channel (PUCCH) transmission).

In systems such as new radio (NR), there are various processing times defined to ensure a gNB leaves enough time for the UE to process a transmission or a reception.

For example, one processing time is PDSCH decoding time N1, defined as the number of OFDM symbols required for UE processing from an end of PDSCH reception to the earliest possible start of the corresponding ACK/NACK. Another processing time is PUSCH preparation time N2, defined as the number of OFDM symbols required for UE processing from end of PDCCH containing the uplink (UL) grant to the earliest possible start of the corresponding PUSCH transmission from the UE perspective.

In NR, two sets of UE processing capabilities are defined, generally referred to as Cap 1 and Cap 2. Cap 2 generally corresponds to higher UE processing capability and, thus, shorter times for N1 and N2. For example, FIGS. 7A and 7B illustrate example values for N1 for Cap 1 and Cap 2, respectively. Similarly, FIGS. 8A and 8B illustrate example values for N2 for Cap 1 and Cap 2, respectively. In general, a UE is not expected to transmit anything in the uplink if the network set the values for scheduling parameters (e.g., K1/K2) do not leave sufficient time for UE processing (as indicated by the N1 and N2 values for the UE, based on its capabilities). The different capabilities may have a substantial impact on these values. For example, Cap 2 N2 may be much smaller than Cap 1 N1.

Figure 9:
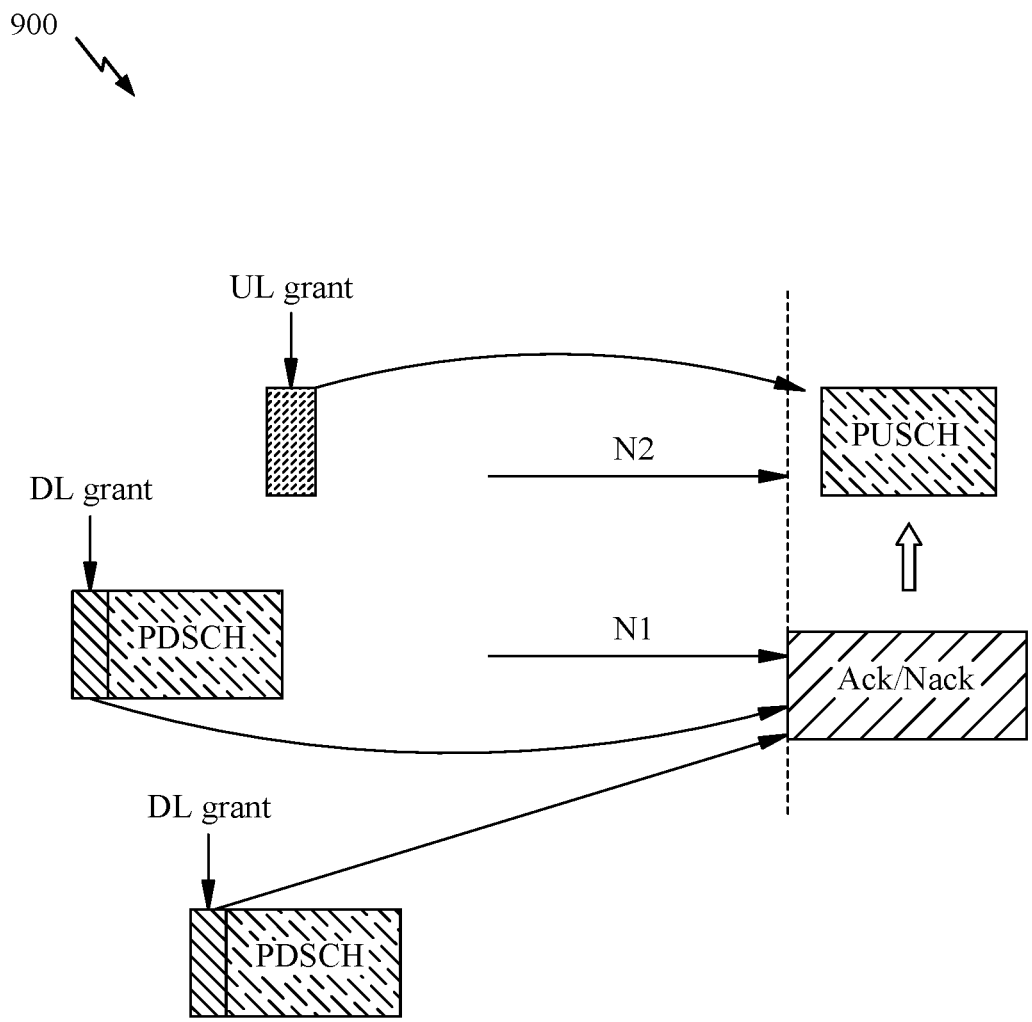
FIG. 9 illustrates an example scenario in which uplink control information (UCI) for one service type may be multiplexed in an uplink transmission for a second service type, in accordance with certain aspects of the present disclosure.

FIG. 9 illustrates the impact of N1 and N2 processing times on UCI multiplexing timeline. In some cases, when acknowledgment (e.g., HARQ-ACK) feedback collides with a PUSCH, the UE may need to piggyback the HARQ-ACK on the PUSCH transmission, provided that one or more timeline conditions, as follows, are met:

The UL grant comes at least N2 symbols earlier than the earliest symbol of the PUSCH and the PUCCH carrying the HARQ-ACK; and/or The DL grant(s) comes at least N1 symbols earlier than the earliest symbol of the PUSCH and the PUCCH carrying the HARQ-ACK.

If the timeline conditions are not satisfied, then it is an error case. In the illustrated example, however, the UL grant comes early enough (e.g., more than N2 symbols before the first symbol of PUSCH and PUCCH indicated by the dashed line) to satisfy the first condition. Similarly, both DL grants come early enough (e.g., more than N1 symbols before the first symbol of PUSCH and PUCCH indicated by the dashed line) to satisfy the second condition.

Multiplexing scenarios may incur complications, however, when different processing capabilities are mixed. For example, a UE may support different service types, such as URLLC and eMBB, according to different processing capabilities. This presents a challenge as the different values of N1 and N2 for the different (e.g., as noted above, Cap2 N2 may be much smaller than Cap1 N1).

Accordingly, aspects of the present disclosure propose various conditions that may allow for multiplexing UCI by taking into account the possibility of supporting different service types and, correspondingly, different processing capabilities.

Figure 10:
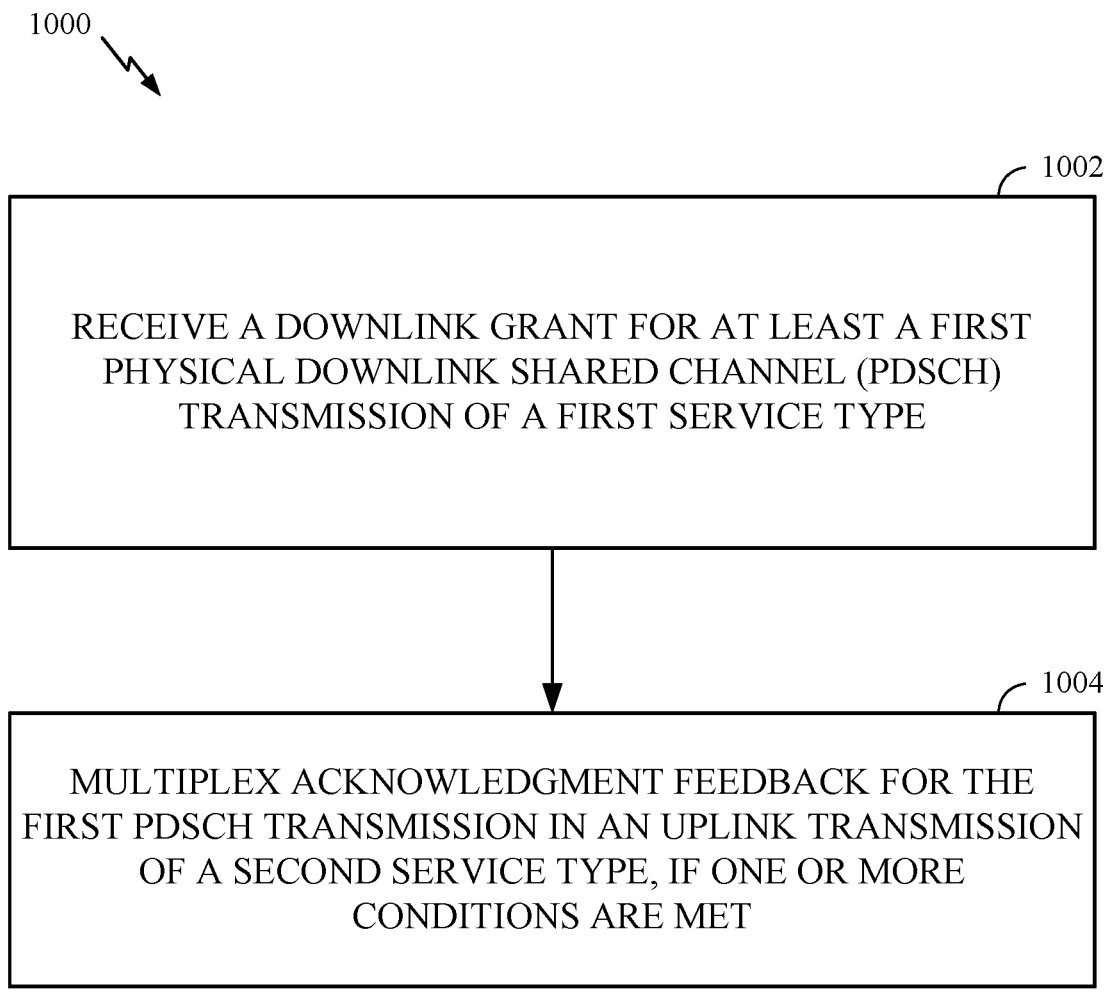
FIG. 10 is a flow diagram illustrating example operations for wireless communication by a UE, in accordance with certain aspects of the present disclosure.

FIG. 10 illustrates example operations 1000 for wireless communication, in accordance with certain aspects of the present disclosure. The operations 1000 may be performed, for example, by a UE (e.g., such as UE 120 in the wireless communication network 100) to multiplex UCI for one service type on an uplink transmission for a second service type.

Operations 1000 begin, at 1002, by receiving a downlink grant for at least a first physical downlink shared channel (PDSCH) transmission of a first service type. At 1004, the UE multiplexes acknowledgment feedback for the first PDSCH transmission in an uplink transmission of a second service type, if one or more conditions are met.

Figure 11:
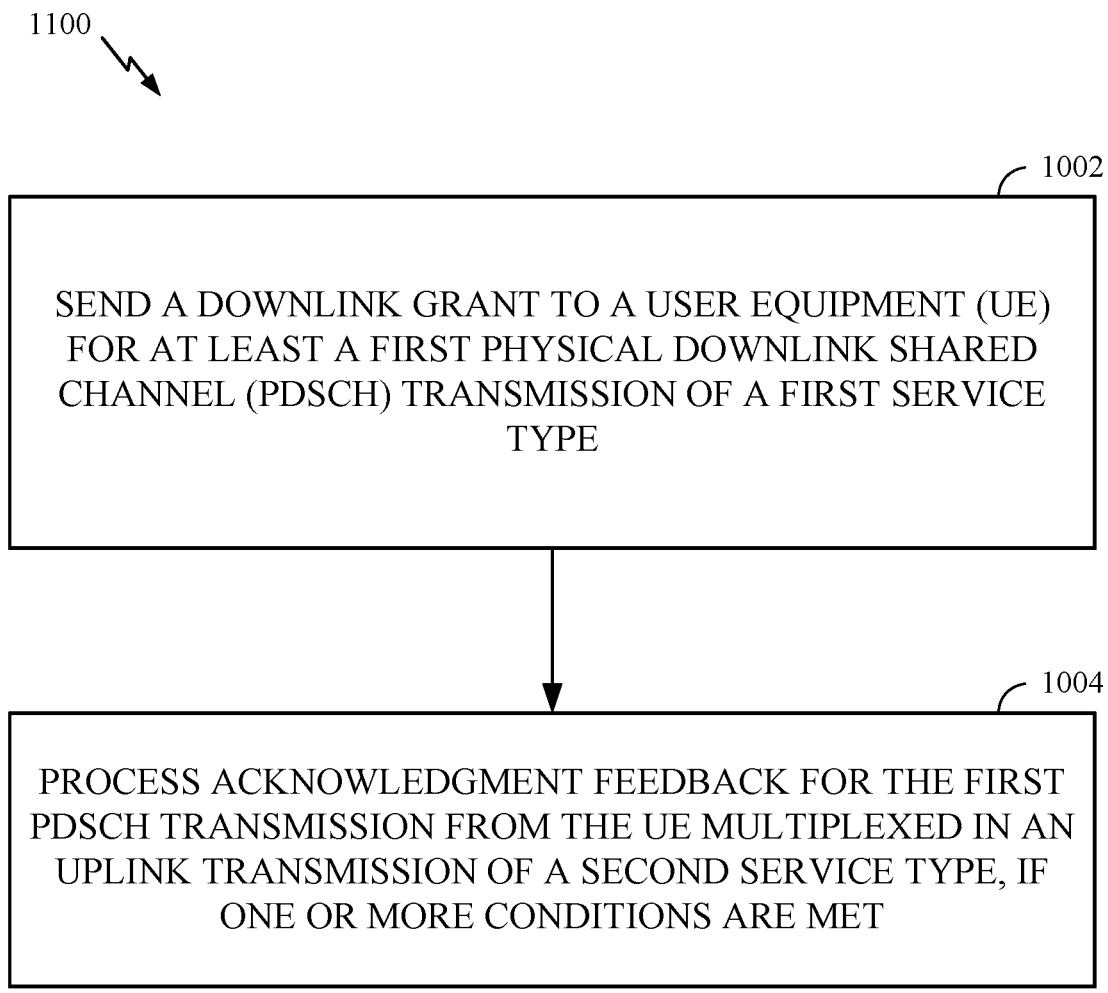
FIG. 11 is a flow diagram illustrating example operations for wireless communication by a network entity, in accordance with certain aspects of the present disclosure.

FIG. 11 illustrates example operations 1100 that may be considered complementary to operations 1000 of FIG. 10. For example, operations 1100 may be performed by a network entity (e.g., such as a BS/gNB 110 in the wireless communication network 100) to process UCI for one service type that is multiplexed on an uplink transmission for a second service type, sent from a UE performing operations 1000 of FIG. 10.

Operations 1100 begin, at 1102, by sending a downlink grant to a user equipment (UE) for at least a first physical downlink shared channel (PDSCH) transmission of a first service type. At 1104, the network entity processes acknowledgment feedback for the first PDSCH transmission from the UE multiplexed in an uplink transmission of a second service type, if one or more conditions are met.

Operations 1000 and 1100 may allow a UE and BS (e.g., gNB) to determine when multiplexing of UCI for one service type is allowed on an uplink transmission of a second service type. A gNB may use the conditions described herein to determine when to expect and/how to process UCI multiplexed in this manner. Different conditions may address UCI multiplexing for different scenarios.

For example, a first scenario that may be addressed is the multiplexing of acknowledgment feedback (HARQ-ACK, also referred to as ACK/NACK, or simply A/N) for eMBB transmissions on a URLLC PUSCH.

As noted above, one challenge presented in such a scenarios is that URLLC and eMBB may be running on different processing capabilities, which means previously unanticipated combinations of N1 and N2 values may need to be accommodated. As such, multiplexing (or piggybacking) URLLC A/N on an eMBB PUSCH may cause implementation challenges, even when the processing timelines are satisfied.

Figure 12:
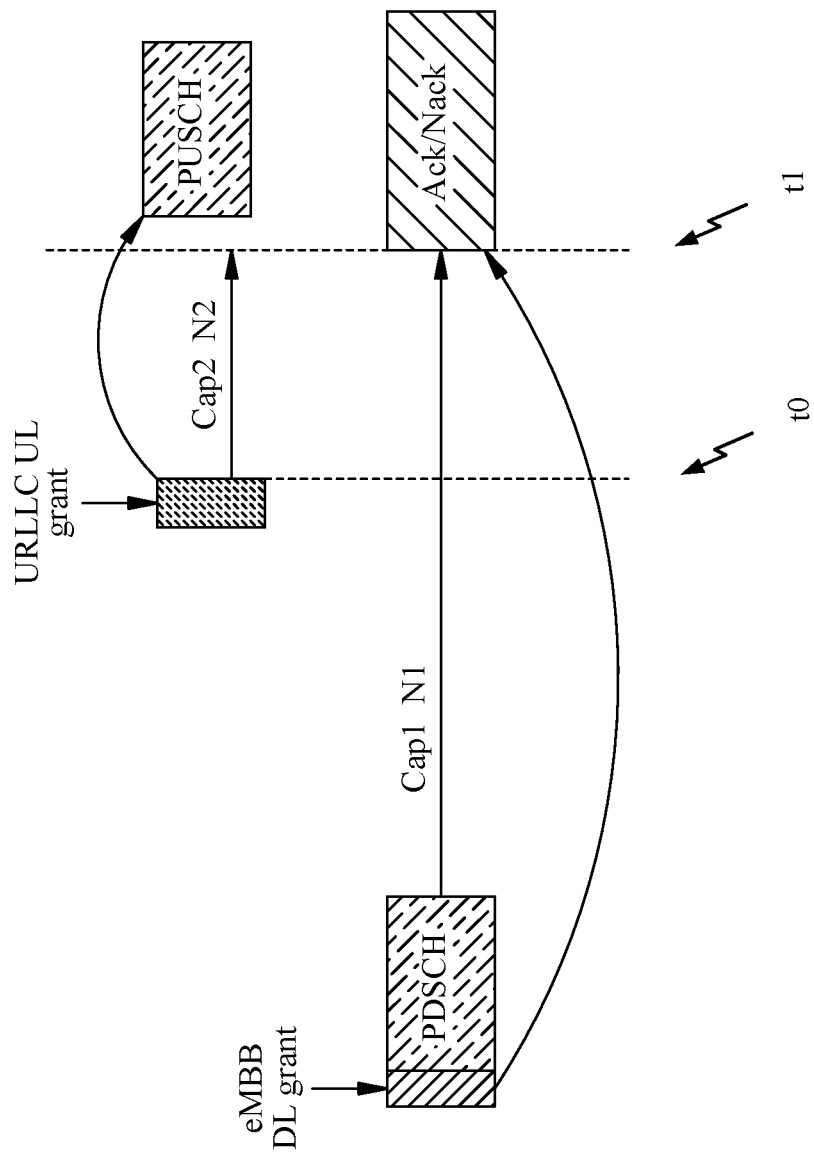
FIG. 12 illustrates another example scenario in which uplink control information (UCI) for one service type may be multiplexed in an uplink transmission for a second service type, in accordance with certain aspects of the present disclosure.

These challenges are illustrated with reference to FIG. 12. As noted before, and as illustrated in this example, Cap2 N2 values for URLLC may be much smaller than Cap1 N1 values for eMBB. Thus, by the time the URLLC UL grant comes (ending at the dashed line labeled t0), the UE may have already generated the A/N codebook and have started channel coding and modulation. Thus, to still be able to piggyback A/N on the PUSCH corresponding to the UL grant (e.g., which was received late), the UE may need to drop the current UCI processing flow and redo the codebook generation, channel coding, and modulation.

This may be challenging because the HARQ-ACK codebook for reporting on PUCCH and reporting on PUSCH are typically different. The codebook sizes may be different, for example, because the codebook size on PUCCH typically depends on a downlink (DL) downlink assignment index (DAI), while codebook size on PUSCH typically depends on UL DAI. DAI generally refers to a control filed used to indicate how many A/N bits a UE needs to feedback in a particular HARQ-ACK report. Further, channel coding rate for UCI reporting on PUCCH and on PUSCH may be different. For example, if polar coding is used (e.g., in the case in which the HARQ-ACK codebook size exceeds 11 bits), then different rate-matching may be used (e.g., puncturing, shortening, or repetition) depending on the channel coding rate. This implies that, when the UE switches from generating HARQ-ACK report on PUCCH to generating HARQ-ACK report on a PUSCH, UE may redo the polar encoding and rate matching.

Thus, aspects of the present disclosure may address this scenario by imposing additional conditions for piggyback (e.g., in addition to the existing timeline conditions for N1 and N2 described above that assume a single UE capability).

In some cases, the additional timeline conditions may dictate that a UE only piggyback if the gap between end of PDCCH carrying the UL grant and the earliest UL symbol (e.g., among the PUCCH and PUSCH) is no smaller than a threshold value. In some cases, the threshold value may be a value determined as $N_1$, $N_3$, or $N_2$+d. $N_3$ generally refers to a minimum time required for a UE to switch A/N reporting from a first PUCCH resource to a second PUCCH resource within a slot. For UE processing capability 1 and SCS configuration μ, $N_3$=8 for μ=0, $N_3$=10 for μ=1, $N_3$=17 for μ=2, $N_3$=20 for μ=3, and for UE processing capability 2 and SCS configuration μ, $N_3$=3 for μ=0, $N_3$=4.5 for μ=1, $N_3$=9 for μ=2. In this condition, the value for $N_1$ may be determined based on the largest processing time in all DL serving cells (for which the UE has received a PDSCH to feedback A/N for on the colliding PUCCH). The parameter d generally refers to a number of additional symbols required for the UE to re-prepare the UCI, the value of which could depend on the payload size of the eMBB HARQ-ACK codebook (e.g., the larger the payload, the larger the value of d is).

In some cases, an alternative to the above timeline condition could be configured. For example, the UE may only piggyback eMBB HARQ-ACK on URLLC PUSCH if the DL serving cells containing the PDSCH(s) are configured with the same or higher processing capability as the serving cell(s) containing the PUSCH(s). Referring back to the example in FIG. 12, this alternative timeline condition would not be met (as the cells containing the PDSCH transmissions are configured as Cap 1, while the PUSCH containing cell is configured as Cap 2). Therefore, in the illustrated example in FIG. 12, a UE may not be allowed to piggyback A/N on PUSCH per the alternative timeline condition.

In some cases, a condition may be based on a codebook size (e.g., the eMBB A/N codebook size). For example, a UE may piggyback A/N on PUSCH only if the size of eMBB A/N codebook is less than or equal to a threshold value, or else, eMBB A/N may be dropped otherwise). For example, the threshold may be in terms of some number of bits (e.g., 11 bits or 2 bits).

In NR, for UCI encoding, different coding schemes are used, depending on the UCI payload size. In the case of 1 bit, repetition coding is used. In case of 2 bits, simplex coding is used. In case the payload size is between 3 and 11, Reed-Muller coding is used. If the payload size is above 11 bits, polar coding is used. In some cases, the threshold number of bits may be chosen to account for the difference in complexity of these encoding schemes. For example, selecting a threshold of 2 bits may limit the A/N multiplexing to cases where repetition or simplex encoding is used. Selecting a threshold of 11 bits may exclude the more complex polar coding scheme.

In some cases, other conditions may determine whether a UE multiplexes HARQ-ACK A/N for eMBB transmissions on a URLLC PUSCH. For example, a UE may not multiplex if URLLC and eMBB HARQ-Ack are configured with different types of codebook (e.g., if eMBB uses type 1/semi-static and URLLC uses type 2/dynamic codebook). This condition may be desirable in some cases because the UL DAI signaling mechanism may be different between type 1 and type 2 codebooks. Given the likelihood that there is only 1 DAI field in UL URLLC DCI, it may not be able to indicate both semi-static and dynamic codebook in the same UL DCI. Further, a UE may not expect UL DAI to indicate different values from DL DAI (i.e., the UE may not expect a codebook size change).

Another issue with the scenario of multiplexing HARQ-ACK A/N for eMBB transmissions on a URLLC PUSCH is that the relatively large payload size of eMBB HARQ-ACK codebook may impact the URLLC PUSCH link budget. This may be especially problematic if Type 1 HARQ-ACK codebook (i.e., semi-static) is used for eMBB PUSCH.

Aspects of the present disclosure may address this issue by reducing the eMBB HARQ-ACK codebook size by bundling A/Ns on a per component carrier (CC) basis. For per-CC A/N bundling, the UE may be configured to generate 1 bit for each configured CC, regardless of whether there is a PDSCH received in the CC or not. This configuration may be beneficial because, if the UE misses one DCI in a particular CC, the total DAI will indicate this missing DCI, but UE may not be able to figure out on which CC the DCI is missing. Thus, the UE may not know on which CC it needs to generate NACK, which may lead to a misalignment of the eMBB HARQ-ACK codebook between the UE and base station. This may result in a loss of both the URLLC PUSCH and the eMBB HARQ-ACKs). By feeding 1 bit for each CC regardless of whether a PDSCH is received, in the event a DCI scheduling a PDSCH on one of the CCs is missed, a NACK will be provided, accounting for the missed DCI and allowing that PDSCH to be retransmitted. In some cases, a UE may only provide feedback with a single (1) bit for all CCs if the UE only receives 1 PDCCH with Total DAI and Counter DAI both equal to 1. In other words, Total DAI and Counter DAI values both equaling 1 indicates the UE only received 1 PDSCH from the network, so there is no ambiguity in codebook size between the gNB and UE in this case.

A/N bundling can be either 1) RRC configured or 2) dynamically indicated by the base station using the DCI (e.g., using the DCI that contains the uplink grant), or 3) implicitly determined by the UE (e.g., based on the payload size of the eMBB codebook). In some cases, the UE may determine whether to bundle the A/N based on a beta-factor signaled in the UL DCI. For example, the beta-factor field in UL DCI may contain 2 bits, indicating one of 4 beta-factor values. The UE may be configured to bundle the A/N if certain beta-factor values are indicated, but not bundle A/N if other beta-values are indicated. One example of implicit determination is to let the UE bundle the A/N if the payload size is greater than a certain threshold (e.g., 2 bits), or otherwise not bundle.

A second scenario for UCI multiplexing that may be addressed by the techniques presented herein is the multiplexing of URLLC HARQ-ACK on eMBB PUSCH.

One issue with this first scenario is that in some systems (e.g., Rel-15), there may be a requirement that a DL grant comes no later than an UL grant in order to piggyback A/N on PUSCH. The motivation for this restriction may be that UL DAI is typically needed to signal the codebook size for HARQ-ACK in case of dynamic codebook, or signal the presence of HARQ-ACK on PUSCH in case of semi-static codebook. Unfortunately, this restriction may limit the use case of piggybacking URLLC A/N on eMBB PUSCH.

Figure 13B:
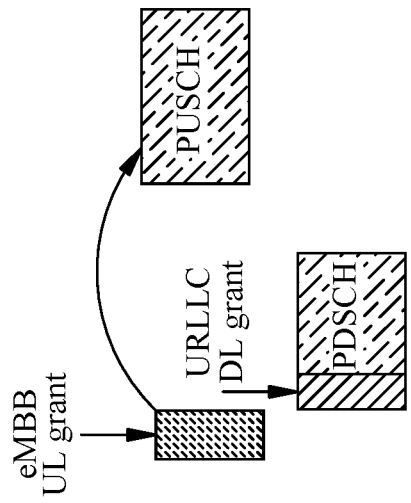
FIGS. 13A and 13B illustrate example scenarios in which uplink control information (UCI) for one service type may be multiplexed in an uplink transmission for a second service type, in accordance with certain aspects of the present disclosure.
Figure 13A:
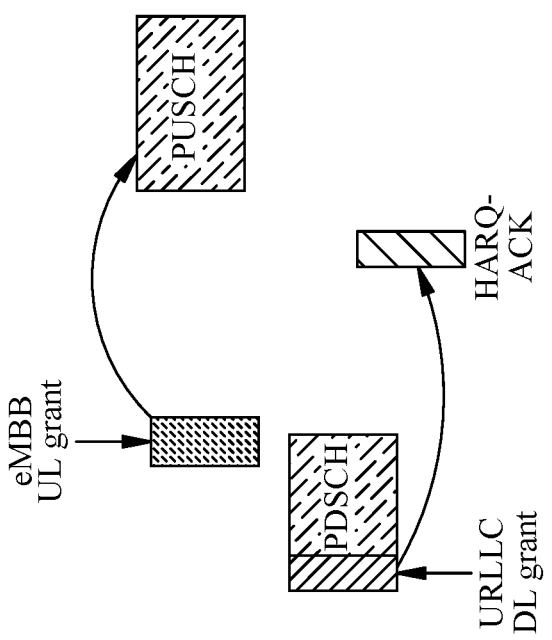

FIG. 13A illustrates a scenario where the URLLC grant comes before an eMBB UL grant. As illustrated, a gap between the DL grant and the HARQ-ACK for URLLC is typically very small to reduce latency. Thus, a gNB may be able to avoid scheduling the eMBB PUSCH to overlap with URLLC A/N.

On the other hand, in conventional systems, if an earlier eMBB PUSCH is scheduled, as illustrated in FIG. 13B, then later HARQ-ACK for the later scheduled URLLC grant has to be either be scheduled after the eMBB PUSCH, or the UE has to drop the eMBB PUSCH and transmit the later HARQ-ACK.

Accordingly, aspects of the present disclosure provide solutions that may enable later HARQ-ACK for a later scheduled URLLC to still be piggybacked on PUSCH in certain cases. In some cases, this scenario may be accommodated by controlling codebook size determination.

As an example, a UE may first determine a codebook C1 for all A/Ns whose corresponding DL grants come no later than UL grant. For example, in FIG. 14A, one DL grant comes earlier than a UL grant.

The UE then checks the UL DAI and compensates for any missing DCIs/DAIs between the last received DL grant before the UL grant and the reception of the UL grant, this results in a codebook C2. In the example illustrated in FIG. 14B, there is no such intervening DL grant.

Finally, the UE may append the A/Ns whose DL grant comes after the UL grant to the C2 codebook, based on the DAI received in these DCIS, which may yield the final codebook C3. In the example illustrated in FIG. 14A, there is one such DL grant. As illustrated in FIG. 14A, this later DL DAI is counted on top of the UL DAI.

In an alternative approach to resolve DAI related issues, when the base station sends the UL grant and the UL DAI, the base station may budget (predict) for the future DL grant, which comes later. This way, the UE can follow the UL DAI in the UL grant to determine the total HARQ-ACK codebook size. Thus, the UL DCI should account for the HARQ-ACKs whose associated DL DCI comes before the UL grant, as well as those HARQ-ACKs whose associated DL DCI comes after the UL grant. If the UE indeed receives some DL DCI later (as shown in FIGS. 10B and 14A), then the UE may put the actual HARQ-ACK corresponding to that PDSCH in the codebook. If the UE does not receive any DL grants after the UL grant (and prior to the transmission of the PUSCH), then the UE can insert one or some NACK bits in these locations. In other words, with this approach, there may be some bits/placeholders reserved in the codebook for later HARQ-ACKs at the time when the base station transmits the UL grant (including UL DAI). The number of reserved bits may be dynamically signaled by the base station to the UE using UL DAI. Later HARQ-ACK bits (whose DCI comes after the UL DCI) may be placed in these placeholders.

Another alternative condition to enable later HARQ-ACK to be piggybacked on PUSCH would be that the end of a PDCCH carrying the DL grant comes X symbols before the earliest UL symbol. FIG. 14B illustrates an example where the end of a PDCCH carrying DL grant satisfies this condition (e.g., assuming X=N2, which could be calculated using the actual PUSCH processing timeline), resulting in URLLC HARQ-ACK piggybacked on the eMBB PUSCH.

Another issue when a gNB schedules a PUSCH transmission is that it may not typically budget any (additional) resources for the later added HARQ-ACK bits. Hence the beta factor signaled in the UL DCI may not be appropriate to guarantee the reliability of the later HARQ-ACK. The beta factor generally refers to a factor that determines the number of PUSCH resources for transmitting the UCI (and is typically dynamically signaled in an UL grant that schedules a PUSCH transmission).

In some cases, an update beta-factor may be provided, for example, the later DL grant may signal a beta-factor that accounts for HARQ-ACK piggybacked on PUSCH. The UE may use the new beta-factor signaled in the DL grant when determining the channel coding for the transmission including the HARQ-ACK (e.g., the beta-factor determines the ratio of the coding rate of PUSCH data over UCI).

Figure 15:
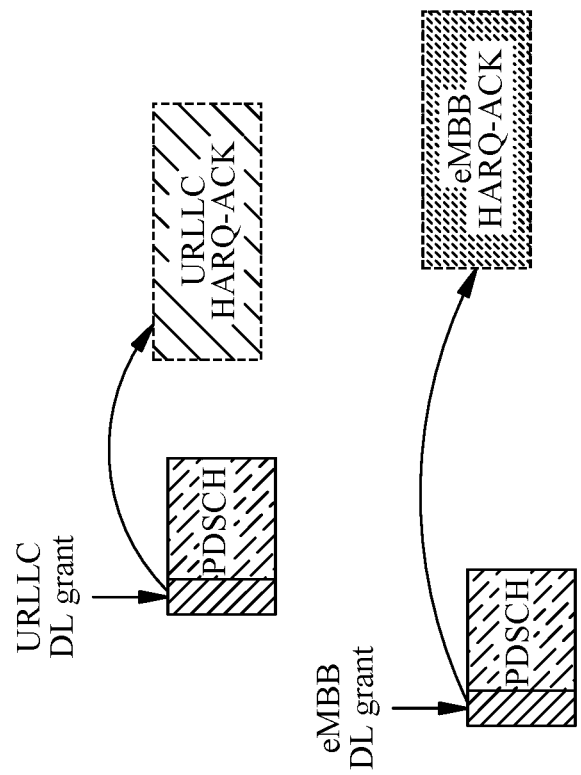
FIG. 15 illustrates still another example scenario in which uplink control information (UCI) for one service type may be multiplexed in an uplink transmission for a second service type, in accordance with certain aspects of the present disclosure.

A third scenario for UCI multiplexing that may be addressed by the techniques presented herein is the multiplexing of both high and lower priority HARQ-ACKs on a same PUCCH. This scenario is illustrated in FIG. 15, which shows how HARQ-ACK for both URLLC and eMBB PDSCH transmission may occur in a same PUCCH transmission occasion.

One challenge with this scenario is how to address codebook size determination with dynamic codebook. For example, since eMBB PDCCH generally has lower priority than URLLC PDCCH, the codebook size misalignment for eMBB HARQ-ACK (e.g., due to missing DCI) may decrease the reliability of URLLC HARQ-ACK codebook.

As noted above, the DL grant DCI may contain a control filed called DAI to indicate how many A/N bits the UE needs to feedback in a particular HARQ-ACK report. The UE may detect a missing DL grant based on comparing two subsequently received DAIs in each DCI. However, if the last DL grant carrying the DAI is missing, then the UE may not be able to figure out the correct codebook size. In this case, there will be a misalignment in the codebook size between UE and gNB. Hence, the gNB will not be able to decode the codebook correctly.

In some scenarios (e.g., NR Rel-16), URLLC and eMBB services may follow different/separate DAI operations. Thus, the DAI of a URLLC DL grant may only indicate the number of URLLC A/N bits and, similarly, the DAI of an eMBB DL grant may only indicate the number of eMBB A/N bits.

One potential solution to address this codebook size issue is to have the eMBB HARQ-ACK codebook follow the URLLC DAI. In this case, after constructing the eMBB codebook using the eMBB DAI, the UE will in addition check the URLLC DAI. If the URLLC DAI differs from the eMBB DAI, then the UE will insert NACK bits to the eMBB codebook until the determined eMBB codebook size matches the URLLC DAI. In some cases, a modulo function may be applied to determine the actual codebook size. For example, if DAI only has 2 bits, the DAI may be interpreted as indicating the modulo 4 values of the true size (e.g., 0,1,2,3). Thus, if eMBB DAI indicates 3, and URLLC DAI indicates 1, then the UE may interpret that the eMBB codebook size as 5 (i.e., since 5 mod 4=1).

One potential solution to address this codebook size issue is to let both URLLC and eMBB follow the last DAI that the UE receives. The last DAI is typically determined based on the PDCCH monitoring occasion (in time) on which the DAI is received. It two DAIs are received within the same PDCCH monitoring occasion, then the UE may be configured to follow the URLLC DAI for both eMBB and URLLC HARQ-ACK codebook.

Another issue with this third scenario of multiplexing both high and lower priority HARQ-ACKs on a same PUCCH is that large eMBB HARQ-ACK payload size may affect URLLC PUCCH reliability. This is a similar problem to the issue described above with reference to the first scenario and may be addressed in a similar manner (e.g., via bundling the eMBB A/N bits).

An alternative to this issue is to define conditions for when eMBB/URLLC HARQ-ACK multiplexing is allowed. For example, one condition is to configure a UE to only mux eMBB and URLLC if the ratio between eMBB and URLLC HARQ-ACK payload size is smaller than or equal a threshold. This threshold can be either explicitly specified (e.g., in an NR standard) or could be RRC configured to the UE. For example, this ratio threshold could be 1, such that the UE only multiplexes the eMBB HARQ-ACK bits and the URLLC HARQ-ACK bits if the number of eMBB HARQ-ACK bits is less than or equal to the number of URLLC HARQ-ACK bits.

Another possible condition is to only multiplex if the number of eMBB bits is less than or equal to a threshold (e.g., the number of eMBB bits is less than or equal to a threshold of 1 or 2 bits). Still, another possible condition may be to multiplex only if the total size of eMBB and URLLC codebook bits is smaller than a threshold (e.g., 11 bits). Further, yet another possible condition may be for the UE to not multiplex eMBB and URLLC if URLLC and EMBB HARQ-ACK codebooks are different types. Still another possibility may be for the UE to not multiplex eMBB and URLLC if the eMBB HARQ-ACK codebook is semi-static (e.g., because the semi-static codebook may be too large).

EXAMPLE EMBODIMENTS

Embodiment 1

A method for wireless communications by a user equipment (UE), comprising receiving a downlink grant for at least a first physical downlink shared channel (PDSCH) transmission of a first service type, and multiplexing acknowledgment feedback for the first PDSCH transmission in an uplink transmission of a second service type, if one or more conditions are met.

Embodiment 2

The method of Embodiment 1, wherein the UE is configured to apply different processing times when processing traffic of the first and second service types.

Embodiment 3

The method of Embodiment 1 or 2, wherein the first service type comprises eMBB and the second service type comprises URLLC; and further comprising receiving an uplink grant for the uplink transmission, wherein the one or more conditions include a condition that a gap between an end of a physical downlink control channel (PDCCH) carrying the uplink grant, and an earliest symbol of a physical uplink control channel (PUCCH) corresponding to the PDSCH transmission of the first service type or the uplink transmission of the second service type is at least a threshold time.

Embodiment 4

The method of Embodiment 3, wherein the threshold time is based on at least one of a first parameter corresponding to a number of symbols for UE processing from an end of the PDSCH transmission to an earliest start of the acknowledgment feedback, a second parameter corresponding to a number of symbols from an end of the PDCCH carrying the uplink grant to an earliest start of the uplink transmission plus an additional number of one or more symbols, or a third parameter corresponding to a minimum time for the UE to switch reporting acknowledgment feedback from a first uplink resource to a second uplink resource.

Embodiment 5

The method of Embodiment 4, wherein the one or more conditions include at least one of a condition that a serving cell in which the PDSCH transmission is sent is configured with a same or higher processing capability as a serving cell in which the uplink transmission is sent, a condition that a payload size of a codebook for providing acknowledgment feedback for the first service type is less than or equal to a threshold size, or a condition that the UE is not configured to provide acknowledgment feedback for the first and second service types using different types of codebooks.

Embodiment 6

The method of Embodiment 4 or 5, further comprising receiving a configuration to bundle acknowledgment feedback for multiple PDSCH transmissions on a per component carrier (CC) basis.

Embodiment 7

The method of Embodiment 5 or 6, further comprising receiving a configuration to bundle acknowledgment feedback for all PDSCH transmissions on a given CC in a single bit.

Embodiment 8

The method of any of Embodiments 5-6, further comprising providing a single bit of acknowledgment feedback for all CCs if the UE only receives a single PDCCH with a total downlink assignment index (DAI) and counter DAI field are both set to one.

Embodiment 9

The method of any of Embodiments 1-8, wherein the first service type comprises URLLC and the second service type comprises eMBB, and the one or more conditions allow the downlink grant to come after an uplink grant for the uplink transmission.

Embodiment 10

The method of Embodiment 9, wherein the one or more conditions comprise the UE is configured to determine a codebook for multiplexing acknowledgment feedback for the first PDSCH transmission in the uplink transmission based on a first codebook for acknowledgment feedback corresponding to downlink grants that came earlier than the uplink grant, a second codebook to account for missing grants, if any, between a last received downlink grant before the uplink grant and reception of the uplink grant, and acknowledgment feedback corresponding to any downlink grants that came after the uplink grant.

Embodiment 11

The method of Embodiment 9 or 10, wherein the one or more conditions include a condition that an end of a physical downlink control channel (PDCCH) carrying the downlink grant comes at least a threshold number of symbols before an earliest symbol for a physical uplink control channel (PUCCH) corresponding to the PDSCH transmission of the first service type or the uplink transmission of the second service type.

Embodiment 12

The method of any of Embodiments 9-11, wherein the downlink grant that comes after the uplink grant includes a beta-factor value that determines a number of physical uplink shared channel (PUSCH) resources for transmitting the acknowledgment feedback, and one or more conditions include a condition that the UE is to apply the beta-factor value when multiplexing the acknowledgment feedback for the first PDSCH transmission in the uplink transmission.

Embodiment 13

The method of any of Embodiments 1-12, wherein the uplink transmission of the second service type comprises a physical uplink control channel (PUCCH).

Embodiment 14

The method of Embodiment 13, wherein multiplexing acknowledgment feedback for the first PDSCH transmission in an uplink transmission of a second service type comprises at least one of providing the acknowledgment feedback for the PDSCH transmissions of the first service type based, at least in part, on a downlink assignment index (DAI) value received in a transmission of the second service type, or providing the acknowledgment feedback for the PDSCH transmissions of the first service type based, at least in part, on a last received downlink assignment index (DAI) value, regardless of which service type of the transmission in which it is received.

Embodiment 15

The method of Embodiment 13 or 14, wherein the one or more conditions include at least one of a condition that a ratio between a payload size of a codebook for providing acknowledgment feedback for the first service type and a payload size of a codebook for providing acknowledgment feedback for the first service type is less than or equal to a first threshold size, a condition that a total combined payload size of a codebook for providing acknowledgment feedback for the first service type and a payload size of a codebook for providing acknowledgment feedback for the first service type is less than or equal to a threshold size, or a condition that at least one of the codebook for providing acknowledgment feedback for the first service type or the codebook for providing acknowledgment feedback for the first service type is not semi-static.

Embodiment 16

A method for wireless communications by a network entity, comprising sending a downlink grant to a user equipment (UE) for at least a first physical downlink shared channel (PDSCH) transmission of a first service type, and processing acknowledgment feedback for the first PDSCH transmission from the UE multiplexed in an uplink transmission of a second service type, if one or more conditions are met.

Embodiment 17

The method of Embodiment 16, further comprising sending an uplink grant for the uplink transmission, wherein the one or more conditions include a condition that a gap between an end of a physical downlink control channel (PDCCH) carrying the uplink grant and an earliest symbol of a physical uplink control channel (PUCCH) corresponding to the PDSCH transmission of the first service type or the uplink transmission of the second service type is at least a threshold time.

Embodiment 18

The method of Embodiment 17, wherein the threshold time is based on at least one of a first parameter corresponding to a number of symbols for UE processing from an end of the PDSCH transmission to an earliest start of the acknowledgment feedback, a second parameter corresponding to a number of symbols from an end of the PDCCH carrying the uplink grant to an earliest start of the uplink transmission plus an additional number of one or more symbols, or a third parameter corresponding to a minimum time for the UE to switch reporting acknowledgment feedback from a first uplink resource to a second uplink resource.

Embodiment 19

The method of any of Embodiments 16-18, wherein the one or more conditions include at least one of a condition that a serving cell in which the PDSCH transmission is sent is configured with a same or higher processing capability as a serving cell in which the uplink transmission is sent, a condition that a payload size of a codebook for providing acknowledgment feedback for the first service type is less than or equal to a threshold size, or a condition that the UE is not configured to provide acknowledgment feedback for the first and second service types using different types of codebooks.

Embodiment 20

The method of any of Embodiments 16-19, further comprising sending the UE a configuration to bundle acknowledgment feedback for multiple PDSCH transmissions on a per component carrier (CC) basis.

Embodiment 21

The method of Embodiment 20, further comprising transmitting a configuration to the UE to bundle acknowledgment feedback for all PDSCH transmission on a given CC in a single bit.

Embodiment 22

The method of Embodiment 21, further comprising transmitting a configuration to the UE to provide a single bit of acknowledgment feedback for all CCs if the UE only receives a single PDCCH with a total downlink assignment index (DAI) and counter DAI field are both set to one.

Embodiment 23

The method of any of Embodiments 16-22, wherein the one or more conditions allow the downlink grant to come after an uplink grant for the uplink transmission.

Embodiment 24

The method of Embodiment 23, wherein the one or more conditions comprise the UE is configured to determine a codebook for multiplexing acknowledgment feedback for the first PDSCH transmission in the uplink transmission based on a first codebook for acknowledgment feedback corresponding to downlink grants that came earlier than the uplink grant, a second codebook to account for missing grants, if any, between a last received downlink grant before the uplink grant and reception of the uplink grant, and acknowledgment feedback corresponding to any downlink grants that came after the uplink grant.

Embodiment 25

The method of Embodiment 23 or 24, wherein the one or more conditions include a condition that an end of a physical downlink control channel (PDCCH) carrying the downlink grant comes at least a threshold number of symbols before an earliest symbol for a physical uplink control channel (PUCCH) corresponding to the PDSCH transmission of the first service type or the uplink transmission of the second service type.

Embodiment 26

The method of any of Embodiments 23-25, wherein the downlink grant that comes after the uplink grant includes a beta-factor value that determines a number of physical uplink shared channel (PUSCH) resources for transmitting the acknowledgment feedback, and one or more conditions include a condition that the UE is to apply the beta-factor value when multiplexing the acknowledgment feedback for the first PDSCH transmission in the uplink transmission.

Embodiment 27

The method of any of Embodiments 16-26, wherein the uplink transmission of the second service type comprises a physical uplink control channel (PUCCH), and the acknowledgment feedback comprises acknowledgment feedback for the PDSCH transmissions of the first service type based, at least in part, on a downlink assignment index (DAI) value received in a transmission of the second service type or the acknowledgment feedback comprises acknowledgment feedback for the PDSCH transmissions of the first service type based, at least in part, on a last received downlink assignment index (DAI) value, regardless of which service type of the transmission in which it is received.

Embodiment 28

The method of Embodiment 27, wherein the one or more conditions include at least one of a condition that a ratio between a payload size of a codebook for providing acknowledgment feedback for the first service type and a payload size of a codebook for providing acknowledgment feedback for the first service type is less than or equal to a first threshold size, a condition that a total combined payload size of a codebook for providing acknowledgment feedback for the first service type and a payload size of a codebook for providing acknowledgment feedback for the first service type is less than or equal to a threshold size, or a condition that at least one of the codebook for providing acknowledgment feedback for the first service type or the codebook for providing acknowledgment feedback for the first service type is not semi-static.

Embodiment 29

An apparatus for wireless communications by a user equipment (UE), comprising means for receiving a downlink grant for at least a first physical downlink shared channel (PDSCH) transmission of a first service type, and means for multiplexing acknowledgment feedback for the first PDSCH transmission in an uplink transmission of a second service type, if one or more conditions are met.

Embodiment 30

An apparatus for wireless communications by a network entity, comprising means for sending a downlink grant to a user equipment (UE) for at least a first physical downlink shared channel (PDSCH) transmission of a first service type, and means for processing acknowledgment feedback for the first PDSCH transmission from the UE multiplexed in an uplink transmission of a second service type, if one or more conditions are met.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. For example, operations shown in FIG. 10 may be performed by one or more processors of the UE 120 shown in FIG. 4, while operations shown in FIG. 11 may be performed by one or more processors of the BS 110 shown in FIG. 4.

A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a downlink grant for at least a first physical downlink shared channel (PDSCH) transmission of a first service type;
   receiving an uplink grant for an uplink transmission of a second service type; and
   multiplexing acknowledgment feedback for the first PDSCH transmission of the first service type in the uplink transmission of the second service type, if one or more conditions are met, wherein:
      the first service type comprises enhanced mobile broadband (eMBB) and the second service type comprises ultra-reliable low-latency communications (URLLC); and
      the one or more conditions include a condition that a gap between:
         an end of a physical downlink control channel (PDCCH) carrying the uplink grant; and
         an earliest symbol of a physical uplink control channel (PUCCH) corresponding to the PDSCH transmission of the first service type or the uplink transmission of the second service type is at least a threshold time.

2. The method of claim 1, wherein the UE is configured to apply different processing times when processing traffic of the first and second service types.

3. The method of claim 1, wherein the threshold time is based on at least one of:
   a first parameter corresponding to a number of symbols for UE processing from an end of the PDSCH transmission to an earliest start of the acknowledgment feedback;
   a second parameter corresponding to a number of symbols from an end of the PDCCH carrying the uplink grant to an earliest start of the uplink transmission plus an additional number of one or more symbols; or
   a third parameter corresponding to a minimum time for the UE to switch reporting acknowledgment feedback from a first uplink resource to a second uplink resource.

4. The method of claim 3, wherein the one or more conditions include at least one of:
   a condition that a serving cell in which the PDSCH transmission is sent is configured with a same or higher processing capability as a serving cell in which the uplink transmission is sent;
   a condition that a payload size of a codebook for providing acknowledgment feedback for the first service type is less than or equal to a threshold size; or
   a condition that the UE is not configured to provide acknowledgment feedback for the first and second service types using different types of codebooks.

5. The method of claim 4, further comprising receiving a configuration to bundle acknowledgment feedback for all PDSCH transmissions on a given CC in a single bit.

6. The method of claim 4, further comprising providing a single bit of acknowledgment feedback for all CCs if the UE only receives a single PDCCH with a total downlink assignment index (DAI) and counter DAI field are both set to one.

7. The method of claim 3, further comprising receiving a configuration to bundle acknowledgment feedback for multiple PDSCH transmissions on a per component carrier (CC) basis.

8. A method for wireless communications by a user equipment (UE), comprising:
   receiving a downlink grant for at least a first physical downlink shared channel (PDSCH) transmission of a first service type; and
   multiplexing acknowledgment feedback for the first PDSCH transmission of the first service type in an uplink transmission of a second service type, if one or more conditions are met, wherein:
      the first service type comprises ultra-reliable low-latency communications (URLLC) and the second service type comprises enhanced mobile broadband (eMBB);
      the one or more conditions allow the downlink grant to come after an uplink grant for the uplink transmission; and
      the one or more conditions include a condition that an end of a physical downlink control channel (PDCCH) carrying the downlink grant comes at least a threshold number of symbols before an earliest symbol for a physical uplink control channel (PUCCH) corresponding to the PDSCH transmission of the first service type or the uplink transmission of the second service type.

9. The method of claim 8, wherein the one or more conditions comprise the UE is configured to determine a codebook for multiplexing acknowledgment feedback for the first PDSCH transmission in the uplink transmission based on:
   a first codebook for acknowledgment feedback corresponding to downlink grants that came earlier than the uplink grant;
   a second codebook to account for missing grants, if any, between a last received downlink grant before the uplink grant and reception of the uplink grant; and
   acknowledgment feedback corresponding to any downlink grants that came after the uplink grant.

10. The method of claim 8, wherein:
   the downlink grant that comes after the uplink grant includes a beta-factor value that determines a number of physical uplink shared channel (PUSCH) resources for transmitting the acknowledgment feedback; and
one or more conditions include a condition that the UE is to apply the beta-factor value when multiplexing the acknowledgment feedback for the first PDSCH transmission in the uplink transmission.

11. A method for wireless communications by a user equipment (UE), comprising:
receiving a downlink grant for at least a first physical downlink shared channel (PDSCH) transmission of a first service type; and
multiplexing acknowledgment feedback for the first PDSCH transmission in an uplink transmission of a second service type, if one or more conditions are met wherein:
the uplink transmission of the second service type comprises a physical uplink control channel (PUCCH); and
multiplexing acknowledgment feedback for the first PDSCH transmission of the first service type in the uplink transmission of the second service type comprises at least one of:
providing the acknowledgment feedback for the PDSCH transmission of the first service type based, at least in part, on a downlink assignment index (DAI) value received in a transmission of the second service type; or
providing the acknowledgment feedback for the PDSCH transmission of the first service type based, at least in part, on a last received downlink DAI value, regardless of which service type of the transmission in which it is received.

12. The method of claim 11, wherein the one or more conditions include at least one of:
a condition that a ratio between a payload size of a codebook for providing acknowledgment feedback for the first service type and a payload size of a codebook for providing acknowledgment feedback for the first service type is less than or equal to a first threshold size;
a condition that a total combined payload size of a codebook for providing acknowledgment feedback for the first service type and a payload size of a codebook for providing acknowledgment feedback for the first service type is less than or equal to a threshold size; or
a condition that at least one of the codebook for providing acknowledgment feedback for the first service type or the codebook for providing acknowledgment feedback for the first service type is not semi-static.

13. A method for wireless communications by a network entity, comprising:
sending a downlink grant to a user equipment (UE) for at least a first physical downlink shared channel (PDSCH) transmission of a first service type;
sending an uplink grant for an uplink transmission of a second service type; and
processing acknowledgment feedback for the first PDSCH transmission from the UE multiplexed in the uplink transmission of the second service type, if one or more conditions are met, wherein the one or more conditions include a condition that a gap between:
an end of a physical downlink control channel (PDCCH) carrying the uplink grant; and
an earliest symbol of a physical uplink control channel (PUCCH) corresponding to the PDSCH transmission of the first service type or the uplink transmission of the second service type is at least a threshold time.

14. The method of claim 13, wherein the threshold time is based on at least one of:
a first parameter corresponding to a number of symbols for UE processing from an end of the PDSCH transmission to an earliest start of the acknowledgment feedback;
a second parameter corresponding to a number of symbols from an end of the PDCCH carrying the uplink grant to an earliest start of the uplink transmission plus an additional number of one or more symbols; or
a third parameter corresponding to a minimum time for the UE to switch reporting acknowledgment feedback from a first uplink resource to a second uplink resource.

15. The method of claim 13, wherein the one or more conditions include at least one of:
a condition that a serving cell in which the PDSCH transmission is sent is configured with a same or higher processing capability as a serving cell in which the uplink transmission is sent;
a condition that a payload size of a codebook for providing acknowledgment feedback for the first service type is less than or equal to a threshold size; or
a condition that the UE is not configured to provide acknowledgment feedback for the first and second service types using different types of codebooks.

16. The method of claim 13, further comprising sending the UE a configuration to bundle acknowledgment feedback for multiple PDSCH transmissions on a per component carrier (CC) basis.

17. The method of claim 16, further comprising transmitting a configuration to the UE to bundle acknowledgment feedback for all PDSCH transmission on a given CC in a single bit.

18. The method of claim 17, further comprising transmitting a configuration to the UE to provide a single bit of acknowledgment feedback for all CCs if the UE only receives a single PDCCH with a total downlink assignment index (DAI) and counter DAI field are both set to one.

19. A method for wireless communications by a network entity, comprising:
sending a downlink grant to a user equipment (UE) for at least a first physical downlink shared channel (PDSCH) transmission of a first service type; and
processing acknowledgment feedback for the first PDSCH transmission from the UE multiplexed in an uplink transmission of a second service type, if one or more conditions are met, wherein:
the one or more conditions allow the downlink grant to come after an uplink grant for the uplink transmission; and
the one or more conditions include a condition that an end of a physical downlink control channel (PDCCH) carrying the downlink grant comes at least a threshold number of symbols before an earliest symbol for a physical uplink control channel (PUCCH) corresponding to the PDSCH transmission of the first service type or the uplink transmission of the second service type.

20. The method of claim 19, wherein the one or more conditions comprise the UE is configured to determine a codebook for multiplexing acknowledgment feedback for the first PDSCH transmission in the uplink transmission based on:
a first codebook for acknowledgment feedback corresponding to downlink grants that came earlier than the uplink grant;

a second codebook to account for missing grants, if any, between a last received downlink grant before the uplink grant and reception of the uplink grant; and acknowledgment feedback corresponding to any downlink grants that came after the uplink grant.

21. The method of claim 19, wherein:

the downlink grant that comes after the uplink grant includes a beta-factor value that determines a number of physical uplink shared channel (PUSCH) resources for transmitting the acknowledgment feedback; and one or more conditions include a condition that the UE is to apply the beta-factor value when multiplexing the acknowledgment feedback for the first PDSCH transmission in the uplink transmission.

22. A method for wireless communications by a network entity, comprising:

sending a downlink grant to a user equipment (UE) for at least a first physical downlink shared channel (PDSCH) transmission of a first service type; and processing acknowledgment feedback for the first PDSCH transmission from the UE multiplexed in an uplink transmission of a second service type, if one or more conditions are met, wherein:

the uplink transmission of the second service type comprises a physical uplink control channel (PUCCH); and the acknowledgment feedback comprises acknowledgment feedback for the PDSCH transmissions of the first service type based, at least in part, on a downlink assignment index (DAI) value received in a transmission of the second service type, or the acknowledgment feedback comprises acknowledgment feedback for the PDSCH transmissions of the first service type based, at least in part, on a last received DAI value, regardless of which service type of the transmission in which it is received.

23. The method of claim 22, wherein the one or more conditions include at least one of:

a condition that a ratio between a payload size of a codebook for providing acknowledgment feedback for the first service type and a payload size of a codebook for providing acknowledgment feedback for the first service type is less than or equal to a first threshold size;

a condition that a total combined payload size of a codebook for providing acknowledgment feedback for the first service type and a payload size of a codebook for providing acknowledgment feedback for the first service type is less than or equal to a threshold size; or a condition that at least one of the codebook for providing acknowledgment feedback for the first service type or the codebook for providing acknowledgment feedback for the first service type is not semi-static.

24. An apparatus for wireless communications by a user equipment (UE), comprising:

means for receiving a downlink grant for at least a first physical downlink shared channel (PDSCH) transmission of a first service type;

means for receiving an uplink grant for an uplink transmission of a second service type; and means for multiplexing acknowledgment feedback for the first PDSCH transmission of the first service type in the uplink transmission of the second service type, if one or more conditions are met, wherein:

the first service type comprises enhanced mobile broadband (eMBB) and the second service type comprises ultra-reliable low-latency communications (URLLC); and the one or more conditions include a condition that a gap between:

an end of a physical downlink control channel (PDCCH) carrying the uplink grant; and an earliest symbol of a physical uplink control channel (PUCCH) corresponding to the PDSCH transmission of the first service type or the uplink transmission of the second service type is at least a threshold time.

25. An apparatus for wireless communications by a network entity, comprising:

means for sending a downlink grant to a user equipment (UE) for at least a first physical downlink shared channel (PDSCH) transmission of a first service type;

means for sending an uplink grant for an uplink transmission of a second service type; and means for processing acknowledgment feedback for the first PDSCH transmission from the UE multiplexed in the uplink transmission of the second service type, if one or more conditions are met, wherein the one or more conditions include a condition that a gap between:

an end of a physical downlink control channel (PDCCH) carrying the uplink grant; and an earliest symbol of a physical uplink control channel (PUCCH) corresponding to the PDSCH transmission of the first service type or the uplink transmission of the second service type is at least a threshold time.

* * * * *